United States Patent [19]

Mash

[11] Patent Number: 4,477,151
[45] Date of Patent: Oct. 16, 1984

[54] SMECTIC LIQUID CRYSTAL CELL WITH HEAT PULSE AND LASER

[75] Inventor: Derek H. Mash, Harlow, England

[73] Assignee: ITT Industries, Inc., New York, N.Y.

[21] Appl. No.: 334,497

[22] Filed: Dec. 28, 1981

[51] Int. Cl.³ .................. G02F 1/133; G02F 1/137
[52] U.S. Cl. .................................................. 350/351
[58] Field of Search ........................ 350/351, 350 S

[56] References Cited

U.S. PATENT DOCUMENTS 3,114,836 12/1963 Fergason et al. ............. 350/351 X
4,040,047 8/1977 Hareng et al. ............ 350/350 S X

OTHER PUBLICATIONS

Tani et al., "New Electrothermo-Optic Effect in a Certain Smectic Liquid Crystal with a Pleochroic Dye", Appl. Phys. Lett., 33, (4), Aug. 15, 1978, American Institute of Physics, pp. 275-277.

Primary Examiner—John K. Corbin
Assistant Examiner—David Lewis
Attorney, Agent, or Firm—T. E. Kristofferson; J. M. May

[57] ABSTRACT

A method of operating a homeotropically aligned smectic liquid crystal cell in which the cell is turned from a clear to a scattering state by illumination with an intense flash of light after which a focused laser beam is scanned across the layer to leave clear tracks where homeotropic alignment has been restored thereby producing a display providing, in projection, bright lines on a dark background.

16 Claims, 2 Drawing Figures

SMECTIC LIQUID CRYSTAL CELL WITH HEAT PULSE AND LASER

BACKGROUND OF THE INVENTION

This invention relates to a method of operating a liquid crystal display cell filled with a smectic liquid. The method can be used to form a projection system in which a focused laser beam can be used to write bright lines on a dark background.

If a cell is constructed to confine a thin layer of liquid crystal exhibiting a smectic phase, and the interior surfaces of the cell are treated to promote homeotropic alignment of the liquid crystal molecules adjacent those surfaces, then the visual clarity of such a layer in the isotropic liquid phase is preserved as it is slowly cooled to transform it into the smectic phase. This clarity is preserved in the smectic phase because the slow rate of cooling enables the liquid crystal molecules to assume homeotropic alignment. If however the cell is cooled very rapidly the random orientation of the molecules in the nematic phase becomes transformed into a disordered orientation state in the smectic phase, with the result that the layer scatters light in the visible region of the spectrum.

The present invention utilizes these effects. It uses an intense flash of electromagnetic radiation to produce rapid heating followed by rapid cooling. This promotes the scattering state. In a projection system with a small numerical aperture such scattering regions are used to provide a dark field. Substantially white lines can be written on to this field by tracking a focused laser beam across the surface of the liquid crystal layer at an appropriate rate to supply sufficient energy to the regions successively illuminated by the focused beam to unlock the frozen-in scattering state and allow them to cool slowly enough to produce homeotropic alignment.

SUMMARY OF THE INVENTION

According to the present invention there is provided a method of operating liquid crystal display cell which cell is filled with a layer of liquid exhibiting a smectic phase, wherein the surfaces in contact with the major surfaces of the layer are such that, when the layer is taken by slow cooling into a smectic phase from a less-ordered phase in the absence of an applied electric field, those molecules of the layer adjacent said surfaces are caused to assume a visually clear state that is either an ordered state or a disordered state in which the disorder is on such a fine scale that it appears visually clear, which method includes the step of illuminating a substantial part of the layer with electromagnetic radiation from a flash source at a flux density providing an absorbed energy density within the layer, or within coating(s) adjacent the layer, of between 0.1 and 2.0 joules-$cm^{-2}$ per flash in a preferred embodiment of the invention, so as to provide the layer with a short duration heat pulse which takes the illuminated part of the layer into the isotropic state and restores it to a smectic phase sufficiently rapidly for it to assume and retain a light scattering disordered molecular arrangement of molecules in the smectic phase rather than said visually clear state.

According to a further aspect of the invention there is provided a display system incorporating a liquid crystal display cell filled with a layer of liquid exhibiting a smectic phase, wherein the surfaces in contact with the major surfaces of the layer are such that, when the layer is taken by slow cooling into a smectic phase from a less-ordered phase in the absence of an applied electric field, those molecules of the layer adjacent said surfaces are caused to assume a visually clear state that is either an ordered state or a disordered state in which the disorder is on such a fine scale that it appears visually clear, which system includes flash source adapted to illuminate a substantial part of said layer with electromagnetic radiation of a flux density providing an absorbed energy density within the layer, or within the coating(s) adjacent the layer, of between 0.1 and 2.0 joules-$cm^{-2}$ per flash in a preferred embodiment of the invention, so as to provide the layer with a short duration heat pulse which takes the illuminated part of the layer into the isotropic state and restores it to a smectic phase sufficiently rapidly for it to assume and retain a light-scattering disordered molecular arrangement of molecules in the smectic phase rather than said visually clear state, thus producing an erased, more or less uniform scattering, background.

Once the cell has been provided with the more or less uniformly scattering background, it may be written over by means of a focused laser beam being tracked across the cell. If the tracking is sufficiently slow, a clear line will result.

The visually clear ordered state may be facilitated by treating the surfaces to promote either homeotropic alignment or homogeneous alignment.

DETAILED DESCRIPTION OF THE INVENTION

Figure 1:
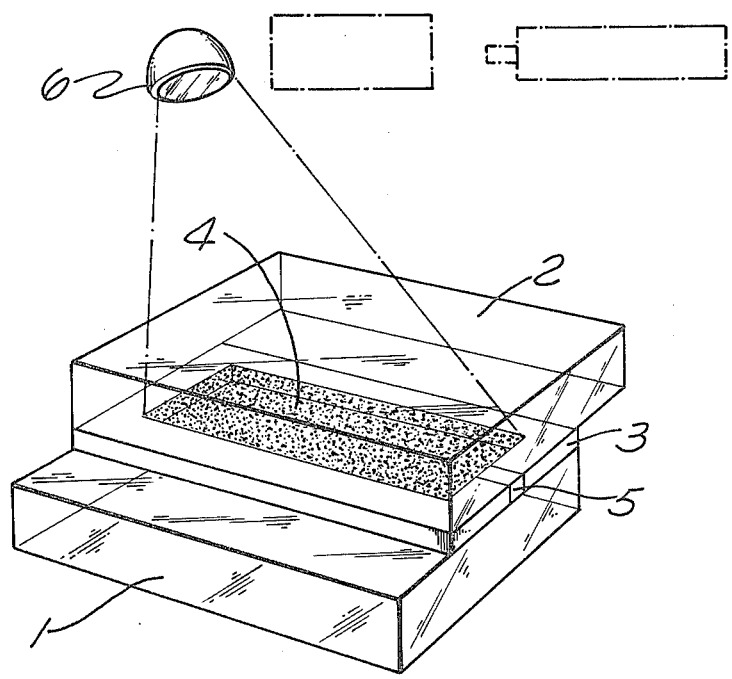
FIG. 1 depicts a schematic perspective view of the cell as it is being erased.

The glass sheets 1 and 2 are secured together with a perimeter spacer and seal 3 to form an envelope for a layer 4 of liquid crystal medium to be hermetically sealed within the cell. These sheets, for instance of borosilicate glass, are at least 0.5 mm thick, and are typically 1 to 2 mm thick. The cell is filled via an aperture formed by an interruption in the perimeter of the seal 3, and, after the cell has been filled, the aperture is sealed off with a plug 5 for instance of indium.

Before they are secured together the inwardly facing surfaces of the two sheets 1 and 2 are optionally provided with transparent electrodes (not shown). Normally, but not necessarily, these cover the entire surfaces so that a uniform electric field can be applied across the thickness of the liquid crystal layer over its entire display area to facilitate and speed up the writing of data in the form of a clear track produced by a laser beam moving across the scattering smectic material, as will be further explained hereinafter. For this purpose portions of the electrodes extend beyond the region of the seal 3 to permit the making of external electrical connection. Optionally, in the region within the perimeter seal, the electroded surfaces are covered with an insulating layer (not shown) so that the cell is not damaged by the flow of direct current that might otherwise occur if the electrodes were accidentally connected across a course of uni-directional electric potential. This layer may be for instance a silica layer about 20 nm thick deposited by reacting silane with oxygen at atmospheric pressure. These surfaces are then treated to promote homeotropic alignment of liquid crystal molecules coming into contact with them. Standard procedures are used for this treatment such as coating with a dilute chrome complex solution in isopropyl alcohol or a dilute solution, also in alcohol, of propyl-trichlorosilane.

Next the two finished plates 1 and 2 are assembled together with the perimeter spacer 3, made for instance of polyethylene terephthalate, and the assembly secured together with a suitable sealant such as epoxy resin. The cell is then vacuum filled through the aperture in the perimeter seal, and finally this aperture is sealed off with indium.

Alternatively the spacer and seal 3 can be made using glass frit, in which case the temperature required to use the frit will normally necessitate the treatment to promote homeotropic alignment being performed after assembly of the cell. Final sealing of the aperture in the seal can similarly be performed using a plug of indium, or alternatively, if the walls of the aperture are first metallized, the aperture can be sealed by soldering.

An example of a suitable liquid crystal material for the filling is 4-cyano-4'-n-octylbiphenyl. This is marketed by BDH under the designation K24, and its crystalline to smectic A, smectic A to nematic, and nematic to isotropic transition temperatures are respectively 21.5° C., 33.5° C. and 40° C. Dye is added to this to enhance the absorption of light from a flash lamp. For this purpose we have used by way of example 2 wt. % of 1-(4-butylanilino)-4-N-methyl-aminoanthraquinone, or 2 wt. % of the much more weakly dichroic dye 1, 4-bis-N-heptylaminoanthraquinone. These dyes give the cell a relatively blue coloration. In the isotropic state the cell appears a clear blue and this clarity is preserved while the cell is slowly cooled causing the filling to assume a smectic A phase.

A cell thus constructed may be converted into an erased state exhibiting a more or less uniform scattering (but still blue) background by illuminating substantially all of it with a flash of light from a flash lamp providing a predetermined light intensity and duration that causes the liquid crystal to absorb the light at an energy density of between 0.1 and 2.0 joules-cm$^{-2}$. This sort of energy density may be provided for example by means of a photographic xenon flash lamp 6 rated at 10 to 15 joules placed about 1 cm from the liquid crystal layer (see FIG. 1). It was calculated that the dye concentration is such as to absorb 20 to 30% of the resulting radiant energy.

Figure 2:
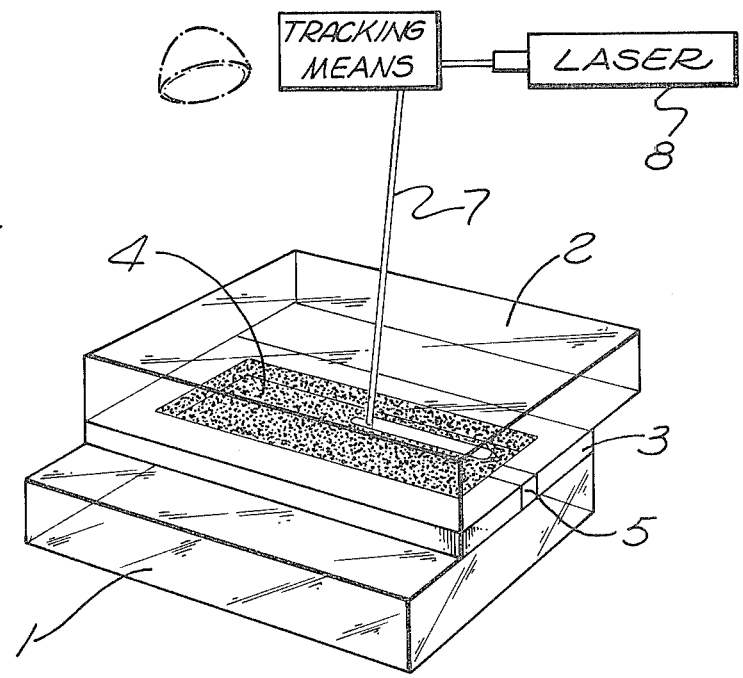
FIG. 2 depicts the cell as a line is being written over an erased background.

A clear track can now be written on the thus-produced scattering background by the local heating produced by tracking a focused laser beam 7 across the liquid crystal layer at a suitable rate (see FIG. 2). In the absence of an applied field this can be achieved with a 50 micron diffraction limited spot size from a helium neon laser 8 having a nominal power output of 5 mW when the spot is tracked at about 1 cm sec$^{-1}$. As the tracking speed is steadily increased the track first becomes less clearly defined, then it disappears altogether, and finally a track may be produced in which the scattering is more dense than the background.

It is the intensity and/or duration of the flash which determines whether or not this final condition is possible. If the flash is adjusted to give a full scattering background, then the laser spot writes a clear line on the scattering material which, when the cell is used in a projection system, then projects as white tracks on a black background. Alternatively the flash may be adjusted to give a partially scattering background in which case the laser spot, according to its intensity and speed, will write either a clear line, projecting as white on grey, or a more scattering line projecting as black on grey.

The upper threshold of about 1 cm-sec$^{-1}$ for writing a clear track is rather slow for some applications, but can be raised by writing while a voltage is applied to the transparent (optional) electrodes to produce an electric field through the thickness of the liquid crystal layer.

Replacing the specific cyanobiphenyl mentioned above with the eutectic cyanobiphenyl mixture marketed by BDH under the designation S2, produced a display which is more easily switched by flash-light into a more nearly uniform scattering state. This improvement is believed to be because the temperature range of its nematic phase is smaller. Its crystalline to smectic A, smectic A to nematic, and nematic to isotropic transition temperatures are respectively −10° C., 48° C. and 49° C.

It should be clearly understood that the addition of a separate dye to a smectic material would not be necessary if the smectic itself is sufficiently optically absorbing. Even when the smectic material is not itself sufficiently absorbing, the dye can be dispensed with if optically absorbing coatings are provided adjacent the liquid crystal layer so that energy is absorbed by the coatings, which then heat the liquid crystal layer by conduction. In this context it is to be noted that the indium-tin oxide normally used for transparent electrodes for liquid crystal display cells absorbs relatively strongly in the near infra-red.

If a light-absorbing patterned mask is placed between the flash lamp and the cell, the clear parts of the mask are reproduced as scattering regions in the cell, yielding an image which can be seen directly or projected to provide a 'negative' of the mask. This effect is enhanced when a pleochroic dye is used in the liquid crystal, since such a dye has a different absorption to light when it is in a disordered state compared with its absorption in an ordered state. Combinations of dyes can be used in this way to give color effects on projection.

The invention has been described by reference to specific examples. Those skilled in the art will recognize that modifications other than those specifically mentioned can be made without departing from the spirit of the invention and the scope of the present invention is defined solely by the appended claims.

I claim:

1. A method of operating a liquid crystal display cell having two plates defining a space filled with a layer of liquid crystal material exhibiting a smectic phase, wherein the surfaces of said plate in contact with said layer cause the molecules of the layer adjacent said surfaces to assume a substantially visually clear state that is a substantially ordered state when said layer is taken by slow cooling into a smectic phase from a less ordered phase in the absence of an applied electric field, the method comprising the steps of:

first illuminating substantially all of said layer with a flash of light from a flash source at a predetermined flux density to provide said layer with a short duration heat pulse which causes the illuminated part of said layer to enter the isotropic state and return to a smectic phase sufficiently rapidly for said layer to assume and retain a light scattering disordered molecular arrangement of molecules in the smectic phase thereby providing a more or less uniform background;

and thereafter writing on said background by traversing a focused laser beam over selected portions of the flash-illuminated part of said layer to leave a visible track.

2. The method of claim 1, further comprising the additional step of placing a light-absorbing patterned mask between said flash source and said layer, the clear portion of said mask corresponding to said illuminated part of said layer.

3. A method as claimed in claim 1 wherein said liquid material of said layer absorbs the energy from said flash source.

4. A method as claimed in claim 1 wherein at least one of said plates includes an energy-absorbing coating adjacent said layer of liquid material and said coating absorbs the energy from said flash source.

5. A method as claimed in claim 3 or 4 wherein said absorbed energy density has a predetermined value of 0.1–2.0 joules-cm$^{-2}$ per flash.

6. A method as claimed in claim 1, 3 or 4 wherein the beam traversal, in relation to the rate of movement and the beam power, leaves a clear track.

7. A method as claimed in claim 1, 3 or 4 wherein said liquid material of said layer includes a substance exhibiting a smectic phase to which substance has been added a quantity of dye to promote therein the absorption of radiation from the flash source.

8. A method as claimed in claim 1, 3 or 4 wherein said liquid material of said layer exhibits positive dielectric anisotropy and said visually clear state is the homeotropically aligned state.

9. A display system comprising:

a display cell having two plates defining a space filled with a layer of liquid material exhibiting a smectic phase, wherein the surfaces of said plates in contact with said layer cause the molecules of said layer adjacent said surface to assume a substantially visually clear state that is a substantially ordered state when said layer is taken by slow cooling into a smectic phase from a less-ordered phase in the absence of an applied electric field, a flash source for illuminating substantially all of said layer with a flash of light at a predetermined flux density to provide said layer with a short duration heat pulse which causes the illuminated part of said layer to enter the isotropic state and return to a smectic phase sufficiently rapidly for said layer to assume and retain a light-scattering disordered molecular arrangement of molecules in the smectic phase thereby providing a more or less uniform background, and means for thereafter writing on said background by traversing a focused laser beam over selected portions thereof, thereby leaving a visible track over said background.

10. A display system as claimed in claim 9 wherein said liquid material of said layer absorbs the energy from said flash source.

11. A display system as claimed in claim 9 wherein at least one of said plates includes an energy-absorbing coating adjacent said layer of liquid material and said coating absorbs the energy from said flash source.

12. The display system of claim 9 further comprising a light-absorbing patterned mask between said display cell and said flash source, the clear portion of said mask corresponding to said illuminated part of said layer.

13. A display system as claimed in claim 10 or 11 wherein said absorbed energy density has a predetermined value of 0.1–2.0 joules-cm$^{-2}$ per flash.

14. A display system as claimed in claim 9, 10 or 11 wherein the beam traversal, in relation to the rate of movement and the beam power, leaves a clear track.

15. A display system as claimed in claim 9, 10 or 11, wherein said liquid material of said layer includes a substance exhibiting a smectic phase to which substance has been added a quantity of dye to promote therein the absorption of the radiation from the flash source.

16. A display system as claimed in claim 9, 10 or 11 wherein said liquid material of said layer exhibits positive dielectric anisotropy and said visually clear state is the homeotropically aligned state.

* * * * *